US008366030B2

United States Patent
Jeon

(10) Patent No.: US 8,366,030 B2
(45) Date of Patent: Feb. 5, 2013

(54) SELECTIVE COLLECTION SYSTEM FOR RECYCLING INPUT MATERIALS

(75) Inventor: Ki Jeong Jeon, Incheon (KR)

(73) Assignee: Eco Creation International, Inc., Palisades Park, NJ (US)

( * ) Notice: Subject to any disclaimer, the term of this patent is extended or adjusted under 35 U.S.C. 154(b) by 232 days.

(21) Appl. No.: 12/848,618

(22) Filed: Aug. 2, 2010

(65) Prior Publication Data

US 2011/0253817 A1 Oct. 20, 2011

(51) Int. Cl.
*B02C 25/00* (2006.01)
(52) U.S. Cl. .......... 241/34; 241/100; 241/101.2
(58) Field of Classification Search .......... 241/100, 241/101.2, 101.74, 101.741, 34
See application file for complete search history.

(56) References Cited

U.S. PATENT DOCUMENTS 4,373,435 A * 2/1983 Grevich .......... 100/49
5,248,102 A * 9/1993 Bohn .......... 241/99

* cited by examiner

*Primary Examiner* — Mark Rosenbaum
(74) *Attorney, Agent, or Firm* — Im IP Law PLLC; C. Andrew Im

(57) ABSTRACT

A selective collection system for recyclable containers comprising of a housing part, an input device, a material identification device, a sorting guide device, a shredding device, a compressing device, a collection part and a control device. The housing part cases internal component of the selective collection system. The input device is at the upper portion of a housing part and receives an input material laid horizontally on its side. The material identification device receives the input material from the input device and uses a pair of load cells and a metal detect sensor to transmit a signal to the control device, which categorizes the input material into a PET, an aluminum can, or other material based on the signal. The sorting guide device sorts and routes the input material received from the material identification device accordingly. The shredding device receives and shreds the input material received from the sorting guide device if the input material is identified as a PET bottle by the material identification device. The compressing device receives and compresses the input material received from the sorting guide device if the input material is identified as an aluminum can. Then shredded or compressed input material is deposited into the collection part, which includes a PET collection bin and an aluminum can collection bin. Other materials are deposited directly into the other materials collection bin, which is also included in the collection part. If the bins fill up, they can be taken out and emptied. The control device controls the overall operation of the selective collection system.

18 Claims, 15 Drawing Sheets

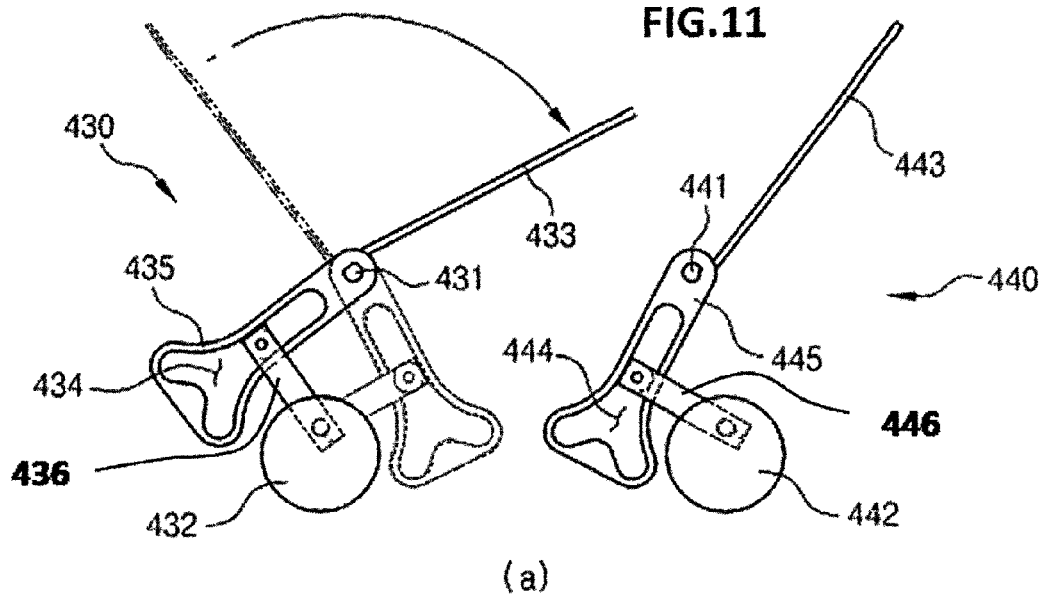
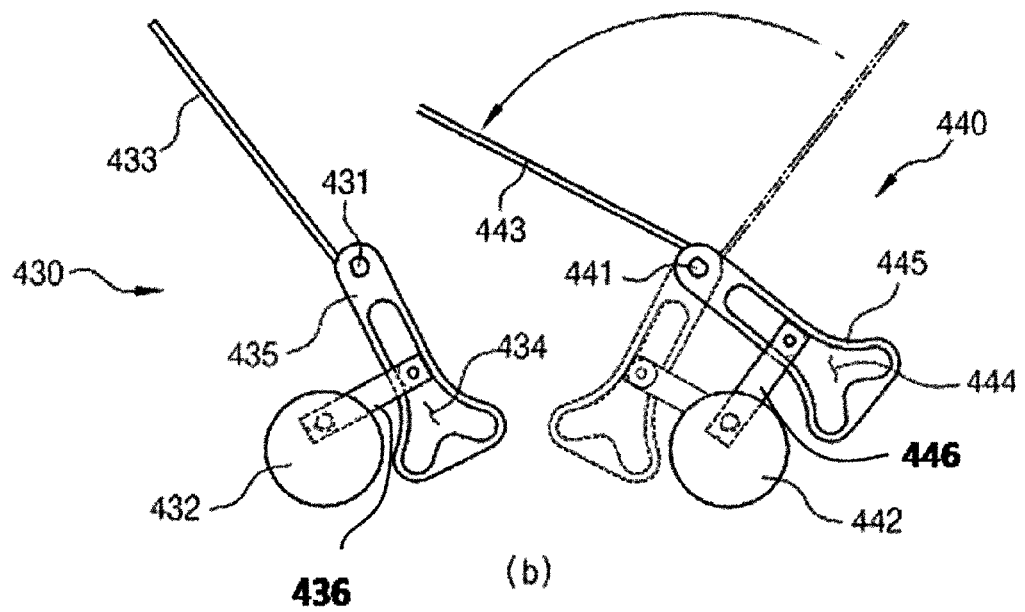
FIG.11

US 8,366,030 B2

SELECTIVE COLLECTION SYSTEM FOR RECYCLING INPUT MATERIALS

RELATED APPLICATION

This application claims priority from Korean Patent Application No. 2010 0036188 filed Apr. 20, 2010, which is incorporated herein by reference in its entirety.

TECHNICAL FIELD

The claimed invention relates to a selective collection system for recycling input materials that transports and performs shredding and compressing operation on the input materials lying on their sides, distinguishes the material of input material, sorts and groups the input materials based on their material content. More particularly, the claimed invention increases the storage space by decreasing installation length (vertical length) of each component to provide more vertical space for longer collection bins, selectively sort the input materials into three categories (1) aluminum cans, (2) plastic (polyethylene terephthalate (PET)) input materials and 3 glass bottles, steel cans and foreign substances and shortens the shredding time of PET bottle input materials, thereby enhancing the shredding efficiency over the conventional press-separate storage system.

BACKGROUND OF THE INVENTION

Typically, input materials including bottles, cans or PET bottle are for one time use and are discarded after use and caused environmental pollution and waste of resources.

FIGS. 1 and 2 show a conventional press separate storage system for beverage input materials, as described in Korean Patent No. 10 0804593, filed by the applicant of the instant application. The press separate storage system for beverage input materials consists of a body part (10) to selectively separate and reduce the recycling input materials, an input device (20) installed on the upper side of the body part (10) to receive the recycling input materials, a metal sensor (21) installed on the side of the input device (20) to detect metal and non-metal input materials, a side compressing device (30) installed at the bottom of the input device (20) to sense and press both sides of the input materials when the input materials are dropped upright from the input device (20), a sound sensor selector on one side of the side compressing device (30) to detect the falling tone of the upright falling input materials and to determine whether to press or shred the input materials, a sorting part (40) installed at the bottom of the side compressing device (30) to guide the predetermined input materials to be compressed or shredded as determined by the sound sorting sensor to the corresponding storage bins, a recycling storage part (50) installed at the bottom of the sorting part (40) having a non-shredding storage part (51) on one side of the sorting part (40) and a shredding storage part (52) on the other side of the sorting part (40) and a shredding device (60) installed on top of the shredding storage part (52) to shred the compressed input materials dropped upright from the sorting part (40).

Such press separate store system for beverage input materials detects whether the input materials are metallic through its metal sensor (21) on one side of the input device (20) when the input materials are inserted upright at the input device (20) on top of the body part (10) by the user. When the system detects that the inserted input material is metallic, the system controls the side compressing device (30) to perform compression on the inserted input material. That is, since the recycling input materials are inserted upright into the input device (20), the recycling input materials are dropped upright into the side compressing device (30). The sound sorting sensor detects the falling tone that is raised off the floor of side compressing device (30) when the recycling input materials are dropped upright into the side compressing device from the input device (20) and determines whether to compress or to shred the input material. When the inserted input material is determined to be a metal input material based on the detected falling tone, the system controls the side compressing device (30) to perform a compressing operation. If the input material is determined to be a non-metal and plastic (e.g., polyethylene terephthalate (PET)) input material, the system controls the side compressing device (30) to perform the compressing operation. If the input material is determined to be a glass bottle, the system controls the side compressing device (30) not to perform the compressing operation.

Through such control, the side compressing device (30) performs the compressing operations for metal cans and non-metal PET bottles. After compressing the recycling input materials by compressing the sides of the upright input materials, the side compressing device (30) drops the compressed input materials into the sorting part (40). The sorting part (40) selectively sorts the input materials depending on the material by having it moved toward non-shredding storage bin (51) when the recycling input materials that are pressed upright are metallic and moved toward shredding storage bin (52) when the pressed input materials are non-metal PET bottles. The recycling input materials that are compressed upright falls into the shredding storage bin (52), shredded through shredding device (60) and are loaded in the shredding storage bin (52). The non-metal and glass input materials are dropped and loaded in the non-shredding storage bin (51) without compression, thereby sorting according to the classification of material and completing the selective compression and selective collection processes. In addition, if the items inserted into the input device (20) are determined to be foreign substances (e.g., rock, paper, debris, etc.) other than glass bottles, PET bottles and metal cans, then the system drops and loads them in the non-shredding storage bin (51) without compression.

Such conventional press separate store system for beverage input materials has multiple issues. Firstly, the conventional press separate store system for beverage input materials has a vertical size restriction. The conventional press separate store system must be made smaller than normal adult height so that the user can insert the input materials into the input device to use the system. Since the recycling input materials are inserted upright through the input device (20) on the upper side of the body part (10) and compressed upright so that the both sides of the input materials are pressed by the side compressing device (30), the installation length (vertical length) of the input device (20) and the side compressing device (30) is long and the storage length (vertical length) of the recycling storage part (30) is relatively short. Therefore, it would be desirable to have a system that is not restrained by such vertical length limitations.

Secondly, the storage space of the recycling storage part (50) of the conventional press separate store system is also narrow. As a result, the operator of such system have to collect recycling input materials that are loaded in the recycling storage part (50) frequently and such issue of maintaining the system often arises. Also, the sorting part (40) of the conventional press separate store system for beverage input materials is structured to selectively guide to either the sorting part (40) or non-shredding storage bin (51), thereby cans, glass bottles and debris are mixed loaded into the non-shredding storage bin (52). Although glass bottles compared to cans have low utilization rate and human resources must be mobilized to sort these mixed loaded input materials by hand to separate the metal cans from the glass bottles and debris, thereby lowering the recycling efficiency of these system. Therefore, it would be desirable to have a system that can collect and sort the input materials into three categories, such as cans, PET bottle and glass bottles, without human intervention.

Thirdly, the shredding device (60) of the conventional press separate store system cannot easily perform the shredding operation on the PET container or input material because of their low weight, leading to longer shredding time and low shredding efficiency. Hence, it would be desirable to have system than readily and easily perform the shredding operation on the PET container or input materials.

OBJECT AND SUMMARY OF THE INVENTION

Therefore, it is an object of the claimed invention to solve the aforementioned problems with the conventional press-separate storage system.

Another object of the claimed invention is to provide a selective collection system that increases storage volume by increasing the heights of the collection bins, shortening the heights of other internal components and installing a forced transport part that transports input materials laid horizontally on their sides from the input device, a material identification device that screens and categorizes the input materials and a sorting guide device that selectively sorts and guides the input materials to appropriate devices or parts of the selective collection system.

A still another object of the claimed invention is to provide a selective collection system that sorts the input materials into three categories (PET, aluminum cans and other materials). In accordance with an exemplary embodiment of the claimed invention, the selective collection system compresses aluminum cans, shreds PET bottles and just drops, without compressing or shredding, other materials such as glass bottles, steel cans and debris.

A yet another object of the claimed invention is to provide a selective collection system that shreds PET bottles over a shorter period of time compared to the conventional press-separate storage system.

In accordance with an exemplary embodiment of the claimed invention, the selective collection system comprises of a housing part, which houses all other internal components of the system, an input device that receives input materials, a material identification device that recognizes input materials, and a sorting guide device that sorts and routes a recognized input material to appropriate devices of the selective collection system. For example, a PET bottle is transported to the shredding device and an aluminum can is transported to the compressing device. Other materials are sent straight to another materials collection bin. A collection part of the claimed invention holds a PET collection bin and an aluminum can collection bin and another materials collection bin. Compressed aluminum cans are deposited into the aluminum can collection bin and shredded PET bottles are deposited into the PET collection bin. The control device controls overall operation of the selective collection system to ensure that input materials are appropriately sorted, operated upon (e.g., shredded, compressed, and dropped without processing) and put into collection bins.

In accordance with an exemplary embodiment of the claimed invention, the selective collection system is easier to maintain than the conventional press-separate storage system because it employs longer collection bins, which leads to more storage space.

The claimed invention is more efficient than the conventional version because of the increased storage space, increased height of collection bins, shortened height of other components and the addition of a forced transport part that transports input materials laid horizontally on their sides from the input device, a material identification device that recognizes the input materials and transmits appropriate signals to a control device, and a sorting guide device that sorts the input materials into proper internal devices.

Also, the claimed invention improves the collecting efficiency by categorizing input materials (PET bottles, aluminum cans and other materials).

Further, the claimed invention improves shredding efficiency by shredding PET bottles in less amount of time relative to the conventional press-separate storage system.

In accordance with an exemplary embodiment of the claimed invention, a selective collection system comprises of a housing part, an input device, a material identification device, a sorting guide device, a shredding device, a compressing device, a collection part and a control device. An input device is situated at the upper portion of a housing part and receives an input material that is laid horizontally on its side. The material identification device recognizes or identifies an input material and transmits information regarding the input material and then drops it down by opening a pair of downward sloping stands into the sorting guide device. The material identification device has a metal detect sensor and a pair of load cells identifies the input material as one of the following categories: an aluminum can, a PET bottle and other material. The sorting guide device sorts and routes the identified input material received from the material identification device. The shredding device shreds the input material received from the sorting guide device and identified as a PET bottle by the material identification device. The compressing device compresses the input material received from a sorting guide device and identified as an aluminum can. The collection part comprises collection bins that store the output materials based on the three foregoing categories and a collection bin drawer onto which the collection bins are placed. The control device controls the overall operation of a selective collection system.

In accordance with an exemplary embodiment of the claimed invention, the input device comprises an input slot at the front of the upper portion of the selective collection system and an automatic sliding door with a sensor inside the input slot. The automatic sliding door is operated by an input side servomotor, two swivels and three shafts. A supporting shaft and one end of a secondary shaft are fixed to each other, preferably welded together, and the supporting shaft is attached to and rotates about an upper swivel. The upper swivel itself is fixed to the housing part. The other end of the secondary shaft is attached to the sliding door and linked to a primary shaft, which is attached to a lower swivel and rotated by the input side servomotor. Once an input material is detected, the motor activates and rotates the sliding door, opening the input slot.

In accordance with an exemplary embodiment of the claimed invention, the selective collection system, as aforementioned, has an input detect sensor which is installed inside the input slot to generate a signal when an input material enters the input slot. The control device commands an input side servomotor to open the input slot in response to the signal the sensor transmitted.

In accordance with an exemplary embodiment of the claimed invention, the material identification device comprises a front side plate, a back side plate, a pair of downward sloping stands, a metal detect sensor and a pair of load cells.

The pair of stands is inserted into shafts, which rotate between front and back side plates to open and close the stands of the material identification device. The stands are tilted downward from the front side plate to the back side plate to ensure that the bottom of the input material received from the input device contacts the back side plate and the pair of downward sloping stands. The metal detect sensor, which is installed on the back side plate, transmits a signal to the control device, which determines whether the input material in the pair of stands is a metal based on the signal. Two load cells, which are installed below the two downward sloping stands, transmit the weight datum of an input material to the control device.

In accordance with an exemplary embodiment of the claimed invention, the selective collection system comprises a forced transport part to forcibly position an input material received from the input device such that the input material is transported from the input device to the material identification device sideways. The forced transport part ensures that the input material makes contact with two downward sloping stands and a back side plate. This is necessary because the input material should be within range for two load cells installed below the downward sloping stands and the metal detect sensor installed behind the back side plate. In other words, the forced transport part ensures that these sensors can fully detect the input material so that the claimed invention can successfully identify or recognize the input material.

In accordance with an exemplary embodiment of the claimed invention, the forced transport part comprises a driving pulley, a driven pulley, a conveyor belt that connects the driving pulley to the driven pulley and a forced transport part side servomotor powering the driving pulley.

In accordance with an exemplary embodiment of the claimed invention, the sorting guide device is installed below the material identification device to form a shredding side channel, a compressing side channel and a dropping side channel. One side (it will be referred as the "shredding side") of the sorting guide device comprises a shredding side entrance, a shredding side diaphragm and a shredding side sorting space that is near the shredding side diaphragm. The other side (the "compressing side") of the sorting device comprises a compressing side entrance, a compressing side diaphragm and a compressing side sorting space that is near the compressing side diaphragm. The shredding device is installed in the shredding side channel and the compressing device in the compressing side channel.

In accordance with an exemplary embodiment of the claimed invention, the shredding side sorting space comprises a shredding side shutter that covers the shredding side entrance, a shredding side sorting shaft into which the shredding side shutter is inserted, a shredding side power transfer link that allows the shredding side servomotor to rotate the shredding side sorting shaft, a shredding side servomotor that powers the shredding side sorting shaft to rotate the shredding side shutter, and a shredding side CAM that limits the rotation of the shredding side shutter to prevent the shredding side shutter from rotating excessively and damaging other parts nearby. The compressing side sorting space comprises a compressing side shutter that covers the compressing side entrance, a compressing side sorting shaft into which the compressing side shutter is inserted, a compressing side power transfer link that allows the compressing side servomotor to rotate the compressing side sorting shaft, a compressing side servomotor that powers the compressing side sorting shaft to rotate the compressing side shutter, and a compressing side CAM that limits the rotation of the compressing side shutter to prevent the compressing side shutter from rotating excessively and damaging other parts nearby.

In accordance with an exemplary embodiment of the claimed invention, the shredding side servomotor rotates the shredding side shutter to open the shredding side entrance if the material identification device identifies or recognizes the input material as a PET bottle and transmits a corresponding signal to the control device. Once the shredding side shutter is open, the input material falls through the shredding side entrance to be shredded by the shredding device. Simultaneously, the compressing side servomotor rotates the compressing side shutter to close the compressing side entrance if the compressing side entrance is open. Of course, if the compressing side entrance is already closed, the compressing side entrance remains closed.

In accordance with an exemplary embodiment of the claimed invention, the compressing side servomotor rotates the compressing side shutter to open the compressing side entrance when the material identification device identifies or recognizes the input material as an aluminum can so that the compressing side shutter is open to receive and route the input material from the material identification device to the compressing device. Simultaneously, the shredding side servomotor rotates the shredding side shutter to close the shredding side entrance if the shredding side entrance is open. Of course, if the shredding side entrance is already closed, the shredding side entrance remains closed.

In accordance with an exemplary embodiment of the claimed invention, the shredding side and compressing side servomotors rotate to close both the shredding side and compressing side shutters when the material identification device identifies or recognizes the input material as neither a PET bottle nor an aluminum can, and transmits an appropriate signal to the control device. Consequently, the sorting guide device directly routes the input material from the material identification device to the other materials collection bin.

In accordance with an exemplary embodiment of the claimed invention, the collection part comprises a PET collection bin, an aluminum can collection bin, and other materials collection bin. The PET collection bin is placed below the shredding device to receive shredded input materials from the shredding device, and the aluminum can collection bin is placed below the compressing device to receive compressed input materials from the compressing device. The other materials collection bin is placed between the PET collection bin and the aluminum can collection bin to receive input materials that were not shredded or compressed by the selective collection system.

In accordance with an exemplary embodiment of the claimed invention, the shredding device comprises a shredding device forced entry part that forcibly inserts a PET bottle into shredding device.

In accordance with an exemplary embodiment of the claimed invention, the shredding device forced entry part comprises a forced entry shaft and forced entry wings, which are inserted into the forced entry shaft. The forced entry wings force the PET bottles into the rotating blades of the shredding device.

In accordance with an exemplary embodiment of the claimed invention, the compressing device comprises a front press plate with a guide hole, a back press plate, a top down plate with a lower portion fixed between the front and back press plates, a middle press plate installed between the front and back press plates, a press shaft that moves in and out of the guide hole, a rotary device and a compressing device power motor. One end of the press shaft is linked with a hinge to the middle press plate. The compressing device power motor powers the movement of the press shaft. One end of the rotary device is linked with a hinge to the other end of the press shaft, and the other end of the rotary device is linked through a gear coupling to the compressing device power motor. The compressing device power motor powers the press shaft to move the middle press plate towards the back press plate and compress the input material.

In accordance with an exemplary embodiment of the claimed invention, the compressing device further comprises a compressed can output space formed at the lower portion of the top down plate and a compressed can output shutter that opens and closes the compressed can output space.

Various other objects, advantages and features of the claimed invention will become readily apparent from the ensuing detailed description. Novel features will be emphatically pointed out in the appended claims.

BRIEF DESCRIPTION OF THE DRAWINGS

The claimed invention is further explained in the description which follows with reference to the drawings, illustrations illustrating, by way of non-limiting examples, various embodiments of the invention, with like reference numerals representing similar parts throughout the several views, and wherein:

FIG. 11 shows exemplary operational phase diagrams of the shredding and compressing side sorting spaces of the sorting guide device in accordance with an exemplary embodiment of the claimed invention;

DETAILED DESCRIPTION OF THE EMBODIMENTS

Figure 1:
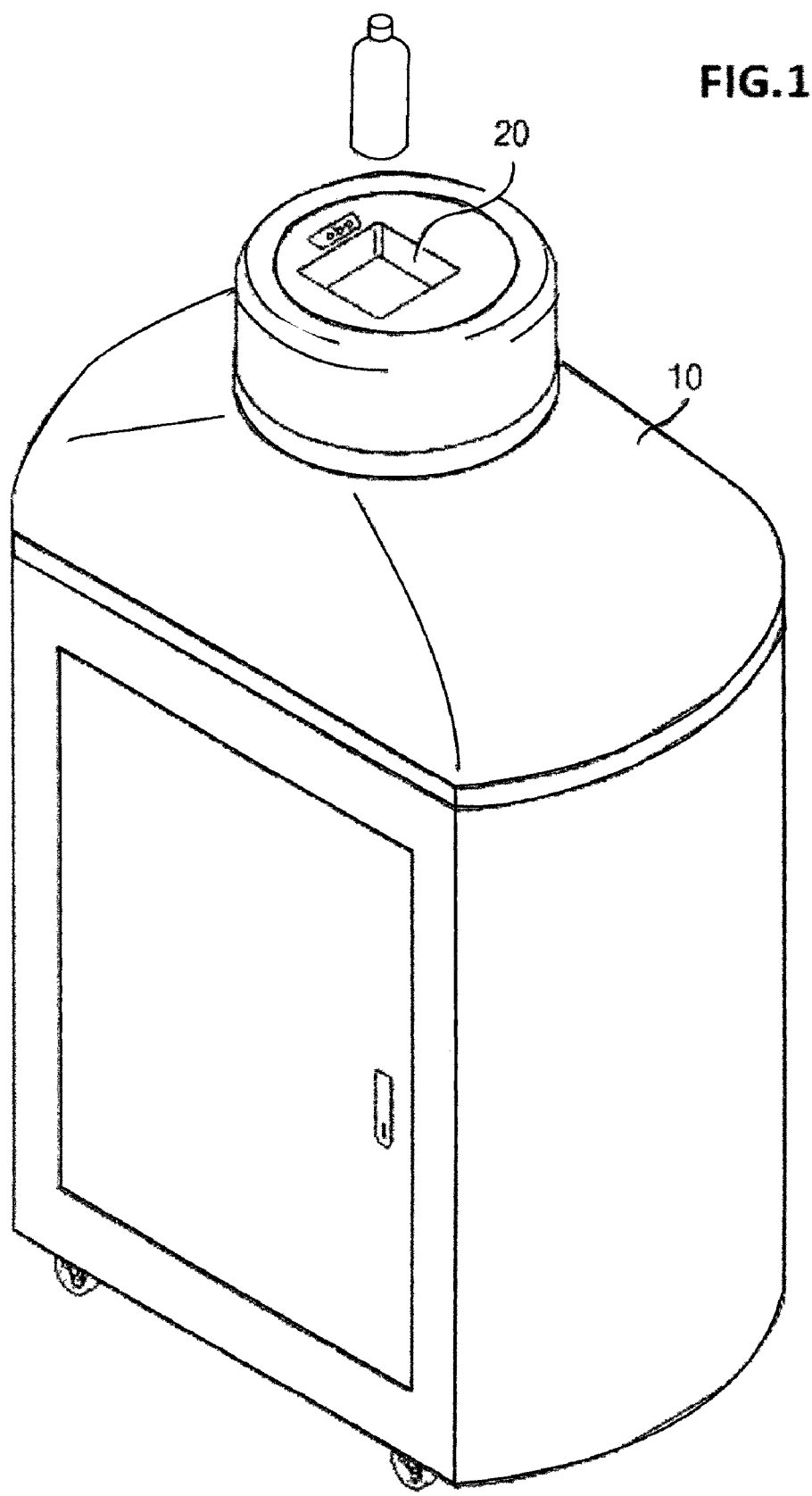
FIG. 1 shows a perspective view of a conventional press-separate storage system for beverage containers.
Figure 2:
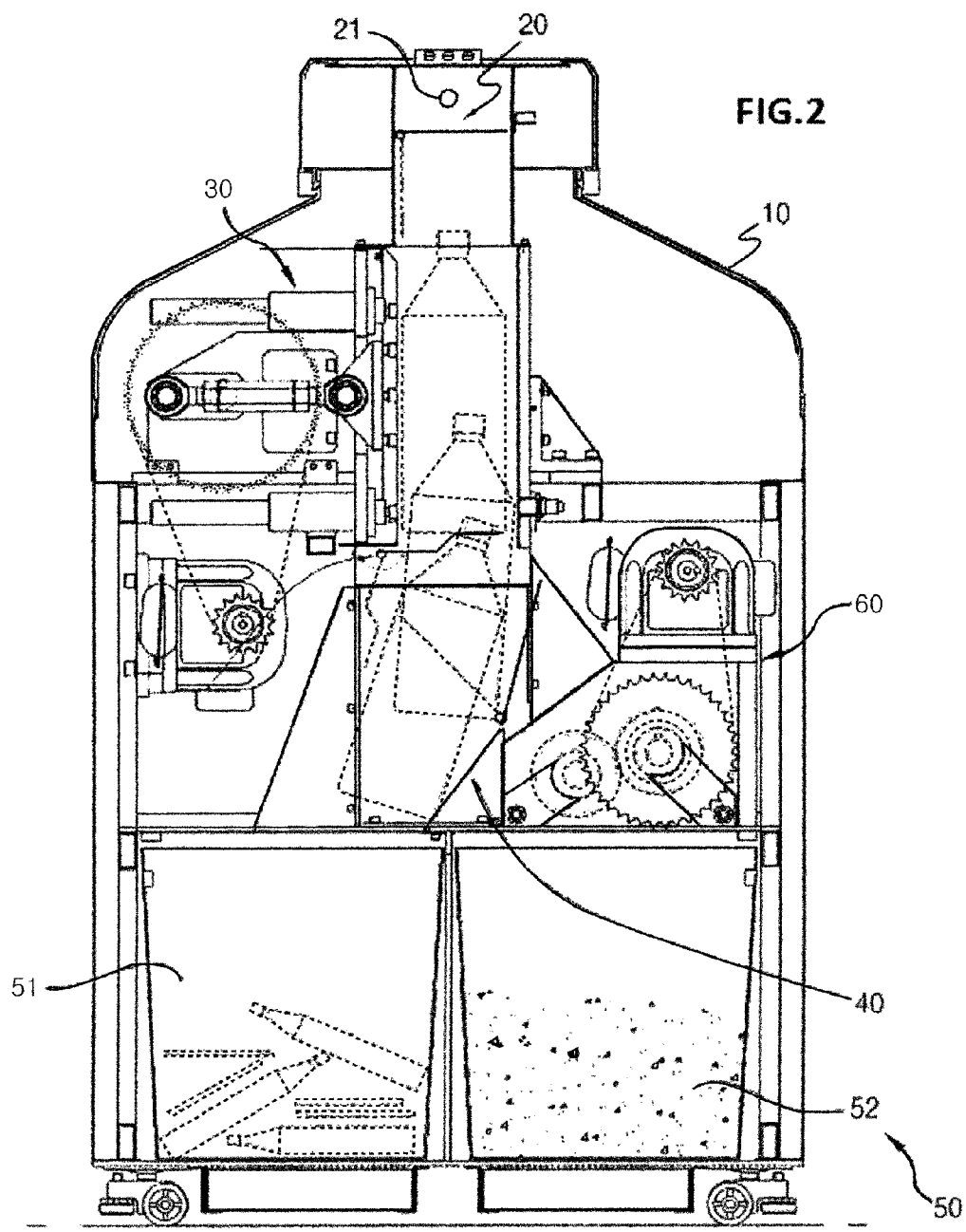
FIG. 2 shows the internal structure of the conventional press-separate storage system of FIG. 1.

As illustrated in each figure, the selective collection system (1000) in accordance with an exemplary embodiment of the claimed invention comprises of a housing part (100), an input device (200), a material identification device (300), a sorting guide device (400), a shredding device (500), a compressing device (600), a collection part (700) and a control device (800). As exemplary shown in FIG. 4, the housing part (100) cases all of the internal components of the selective collection system (1000), including a front side panel (101) and a back side panel (102), which hold in place each component of the claimed selective collection system (1000). Although only the front side panel (101) and the back side panel (102) are shown in FIG. 4 and mentioned herein, the claimed selective collection system (1000) includes other mounting plates of variable shape for holding other internal components in place.

Figure 3:
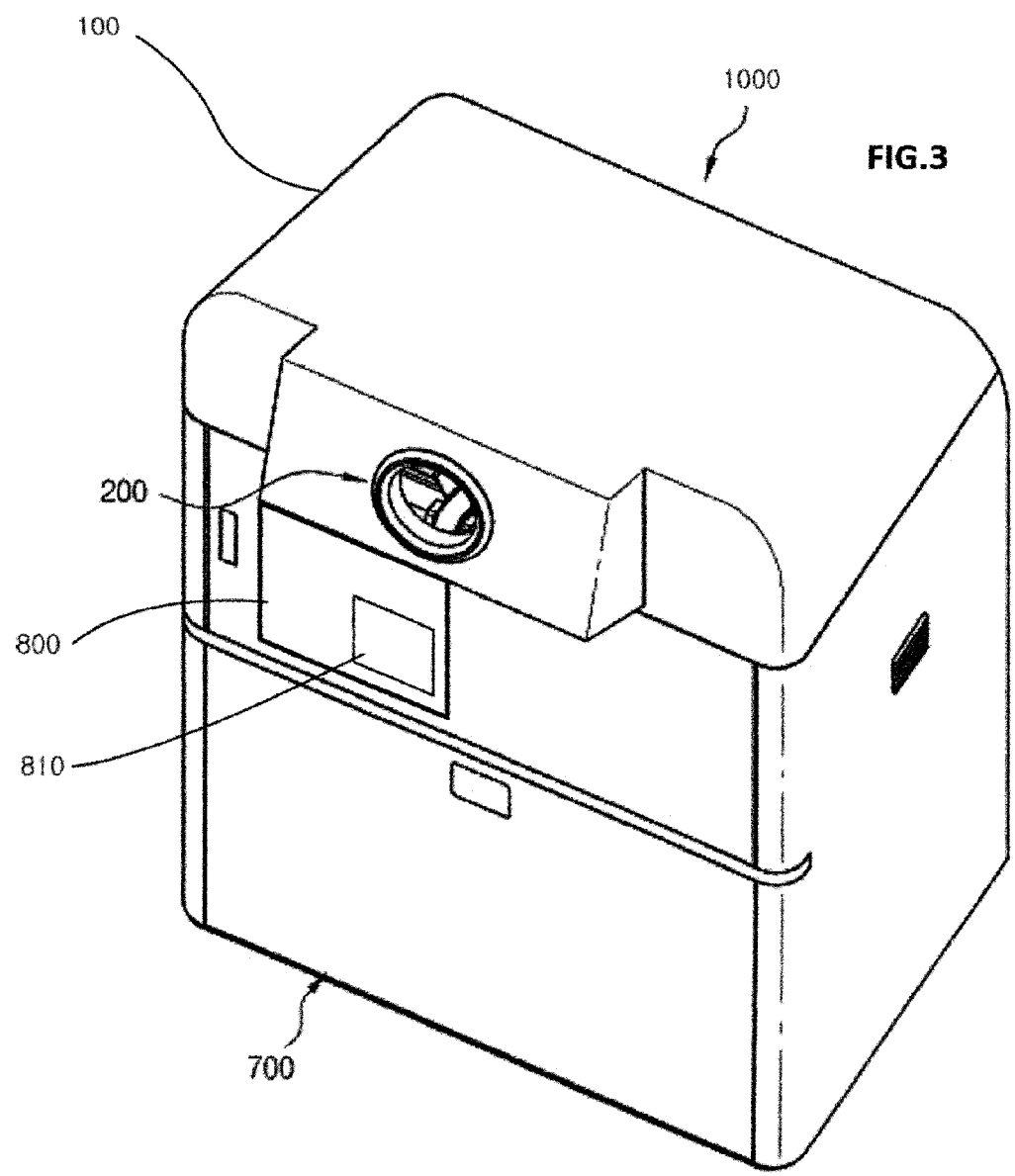
FIG. 3 shows an external view of a selective collection system for recycling containers in accordance with an exemplary embodiment of the claimed invention.
Figure 4:
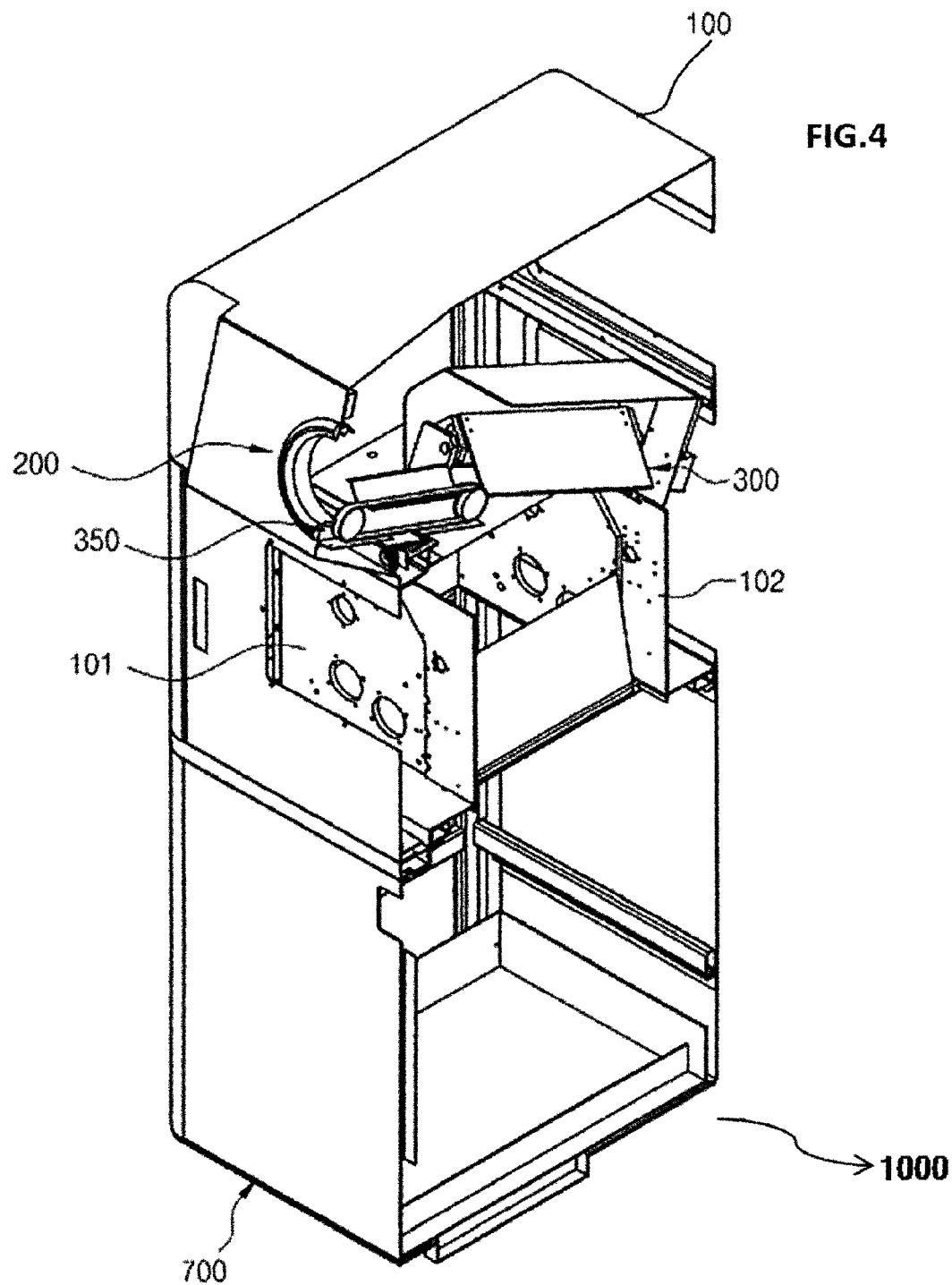
FIG. 4 shows a perspective inside view of the selective collection system for recycling containers in accordance with an exemplary embodiment of the claimed invention.
Figure 10:
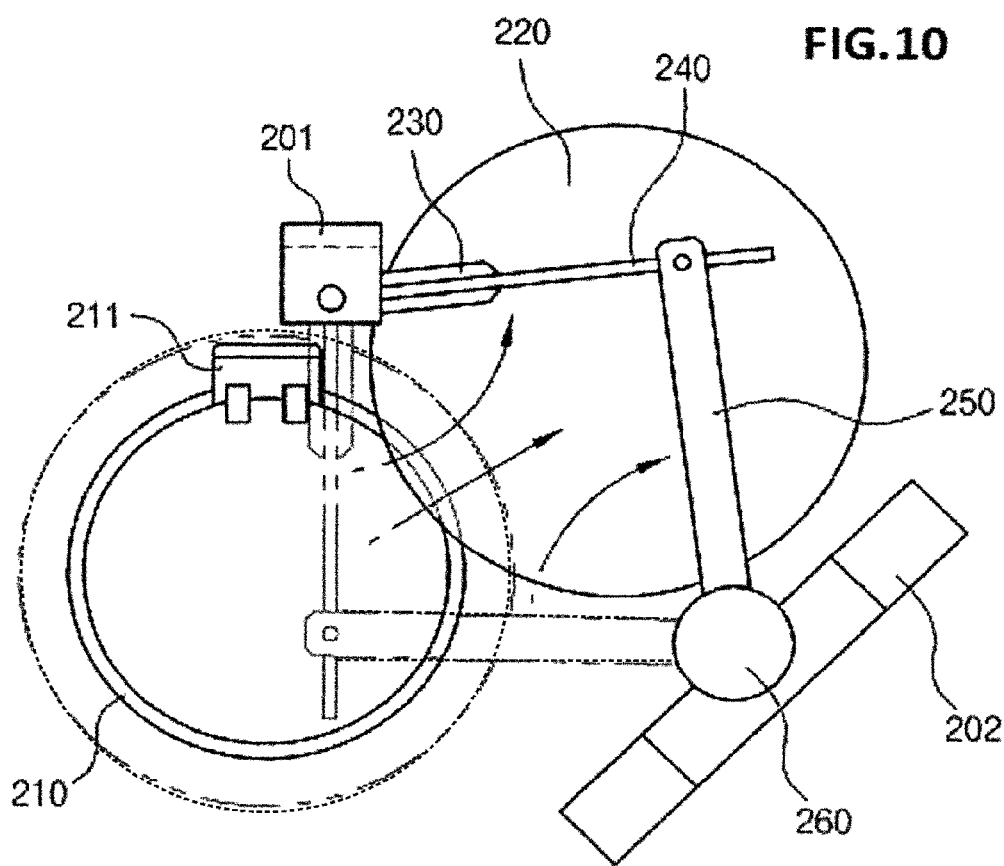
FIG. 10 shows an exemplary operational phase diagram of the input device of the selective collection system in accordance with an exemplary embodiment of the claimed invention.
Figure 12:
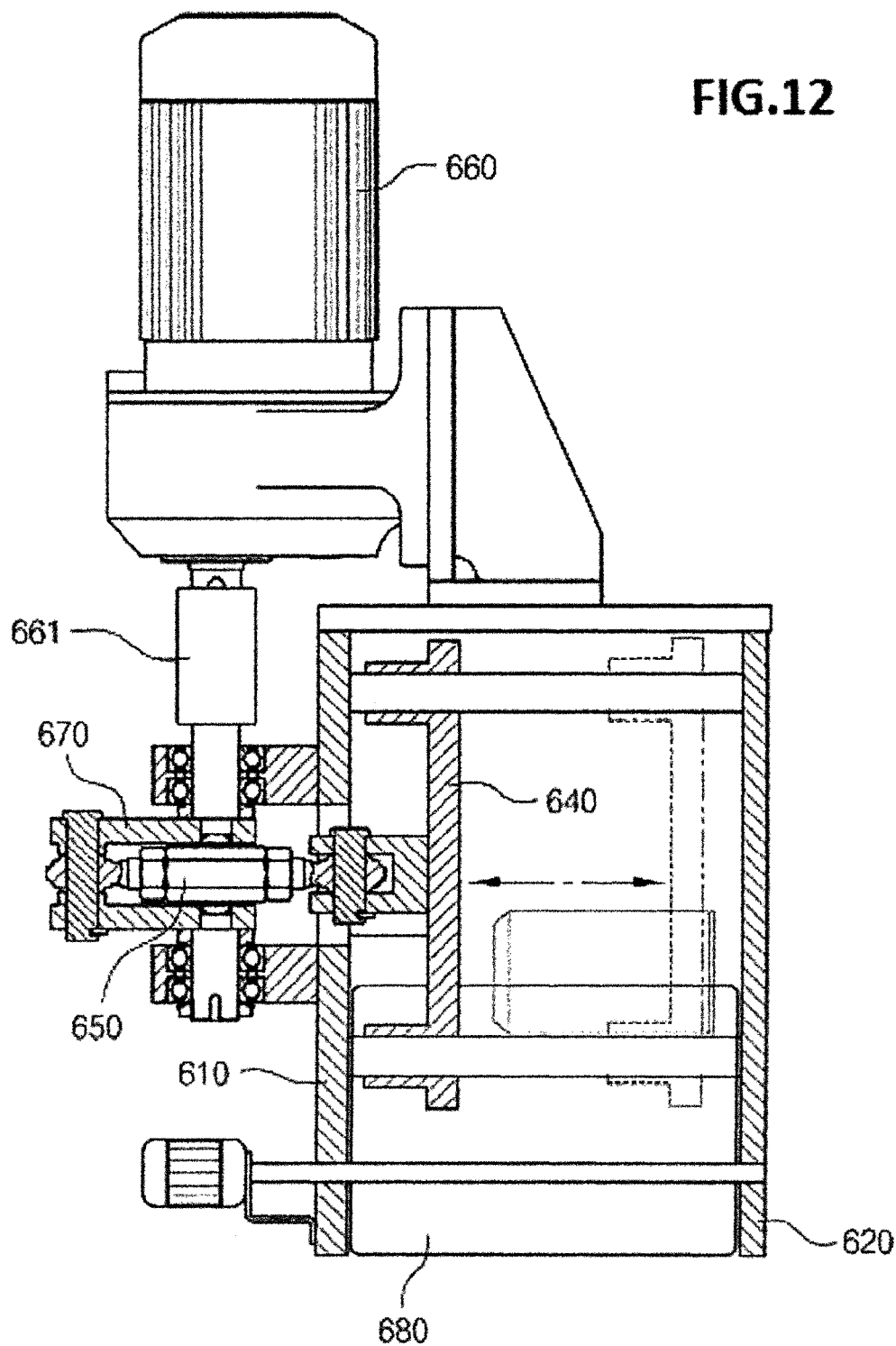
FIG. 12 shows a perspective view of a compressing device of the selective collection system in accordance with an exemplary embodiment of the claimed invention.
Figure 13:
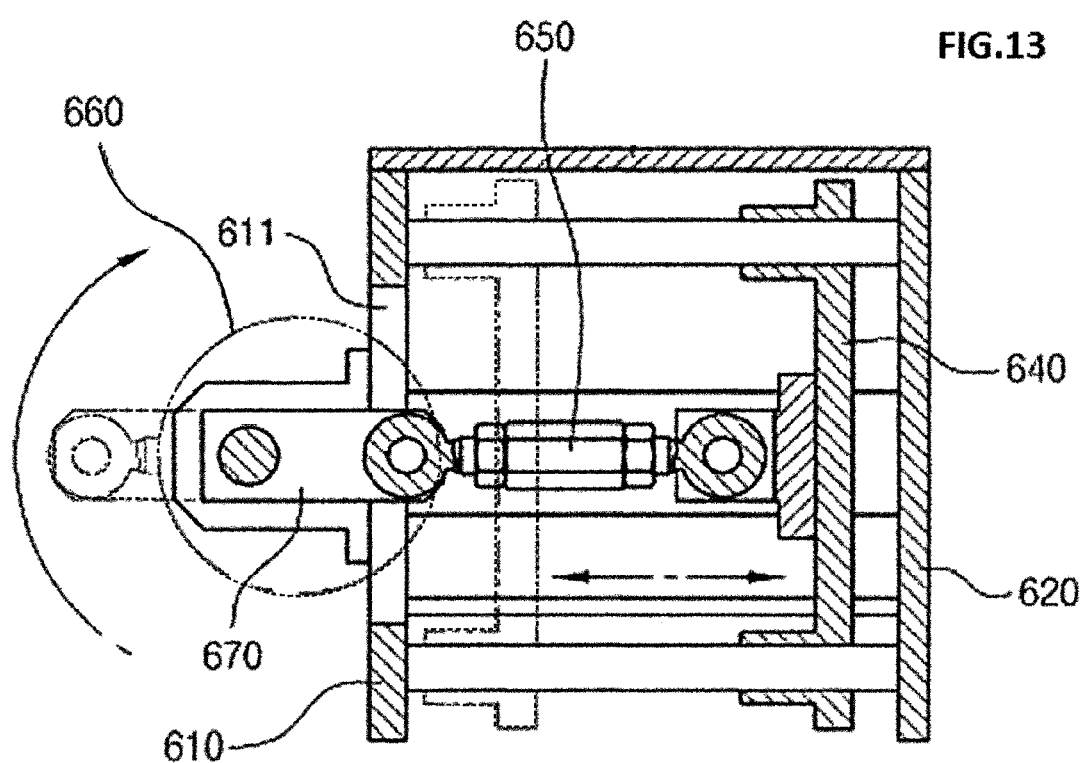
FIG. 13 shows a perspective view of the compressing device of the selective collection system in accordance with an exemplary embodiment of the claimed invention.

As exemplary shown in FIGS. 3 and 4, the input device (200) is preferably installed on the front side of the housing part (100). In accordance with an exemplary embodiment of the claimed invention, as shown in FIG. 10, the input device (200) comprises an input slot (210), a sliding door (220) that covers the input slot (210), a supporting shaft (230) with one end linked to an upper swivel (201), which is fixed to the inside of the housing part (100) and provides rotational movement for the supporting shaft (230) and the other end of the support shaft (230) is fixed, preferably welded to a secondary shaft (240). The secondary shaft (240) is attached to the sliding door (220) and connected to a primary shaft (250) linked with a lower swivel (202) installed on the interior wall of the housing part (100). The input device (200) additionally comprises an input side servomotor (260) providing power to the primary shaft (250).

In accordance with an exemplary embodiment of the claimed invention, the input device (200) further comprises an input detect sensor (211) installed outside of the input slot (210) to generate a signal that rotates the sliding door (220) and open the input slot (210) when an input material is detected. Specifically, the control device (800) controls the input side servomotor (260) when the input detect signal is received from the input detect sensor (211). As a result, the sliding door (220) is rotated clockwise (from the front) upon activation of the input side servomotor (260). After the insertion of the input material, the control device (800) commands the input device (200) to move the sliding door (220) its closed position.

The input detect sensor (211), in accordance with an exemplary embodiment of the claimed invention, is photosensitive, laser sensitive, or ultrasound sensitive. The input detect sensor (211) detects the recycling containers through a light survey.

The material identification device (300) uses its load cells (340) and metal detect sensor (330) to identify an input material received from the input device (200) and transmit the appropriate signal to the control device (800). Two load cells (340) weigh the input material, and the metal detect sensor (330) checks whether the input material is metal. After data are recorded by the metal detect sensor and load cells (330, 340), the data are transmitted to the control device (800)

Figure 5:
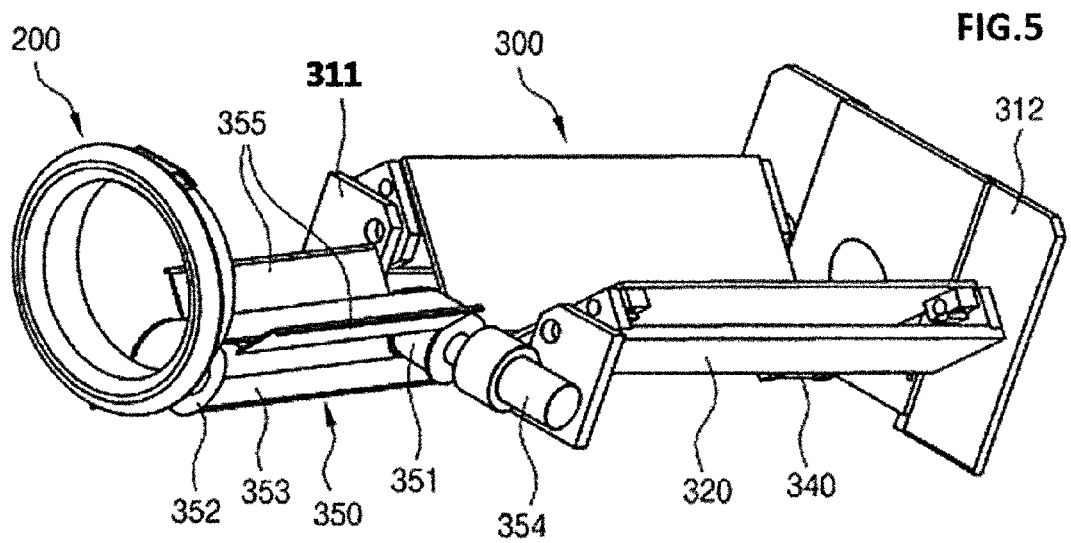
FIGS. 5 and 6 show perspective views of an input device, a forced transport part and a material identification device of the selective collection system in accordance with an exemplary embodiment of the claimed invention.
Figure 6:
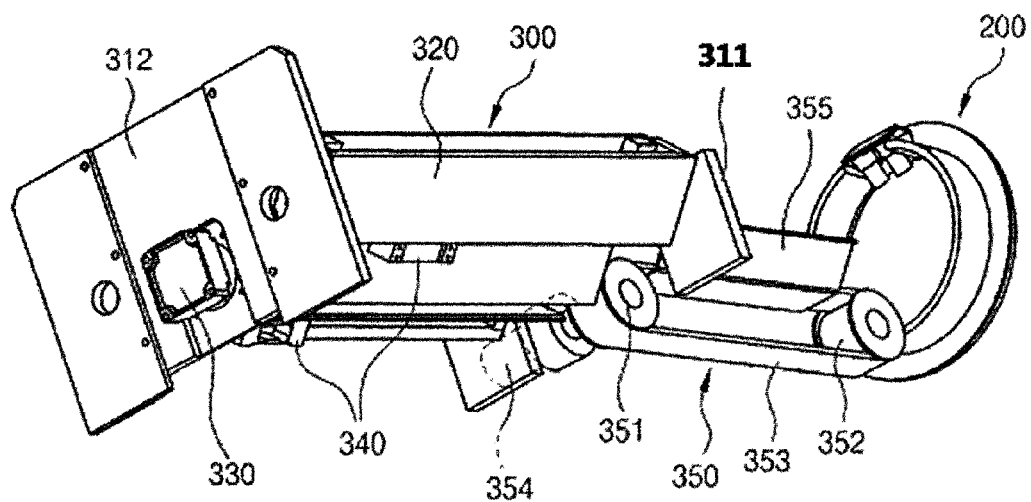

In accordance with an exemplary embodiment of the claimed invention, as exemplary shown in FIGS. 5 and 6, the material identification device (300) comprises of a front side plate (311), a back side plate (312) and a pair of downward sloping stands (320) to make sure that the input materials contact the back side plate (312), thereby ensuring that the metal detect sensor (330), which is attached to the back side plate (312), can check whether the input material is metal. The pair of downward sloping stands (320) open or close by rotating between the front side plate (311) and the back side plate (312). Preferably, two load cells (340) are installed on the bottom of the downward slope stands (320) to measure the weight of the input material on the stands (320) and transmit the measurement to the control device (800). In accordance with an aspect of the claimed invention, the material identification device (300) utilizes the metal detect sensor (330) and two load cells (340) to identify the input material.

Figure 8:
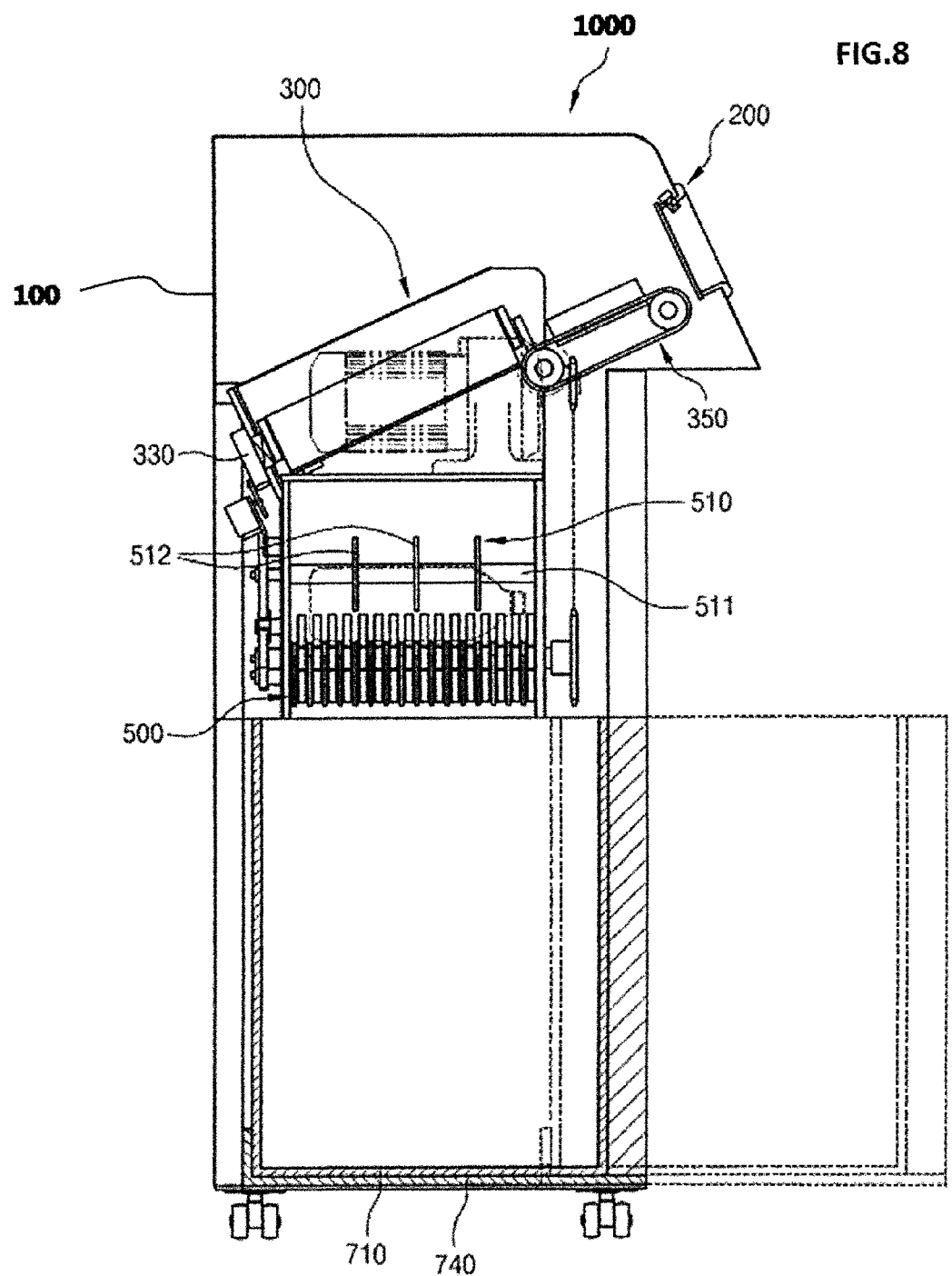
FIG. 8 shows a left side perspective view of the selective collection system for recycling containers in accordance with an exemplary embodiment of the claimed invention.

As shown in FIGS. 3, 4, and 8, the collection part (700) includes three collection bins (710, 720, 730), each of which collects one of the following: aluminum cans, PET bottle (polyethylene terephthalate) and other materials. In accordance with an aspect of the claimed invention, any input material is adequately processed (except for other materials) to deposit as much as possible in the collection bins (710, 720, 730).

In accordance with an exemplary embodiment of the claimed invention, as exemplary shown in FIGS. 5 and 6, the selective collecting system (1000) comprises a forced transport part (350) to ensure that input materials reach the metal detect sensor (330) laid on their sides horizontally. Due to the limited size of the input slot (210), an input material is expected to be usually inserted horizontally and therefore, transported sideways. However, because that might not always be the case, a guiding rail (355) is provided to ensure that an input material is transported laid on its side horizontally. The forced transport part (350) is installed between the input device (200) and the material identification device (300). In accordance with an exemplary embodiment of the claimed invention, the forced transport part (350) comprises a driving pulley (351) and a driven pulley (352) installed between the input device (200) and the material identification device (300), a conveyor belt (353) connected to the driving pulley (351) and the driven pulley (352) and a forced transport part side servomotor (354) providing power to the driving pulley (351).

Figure 7:
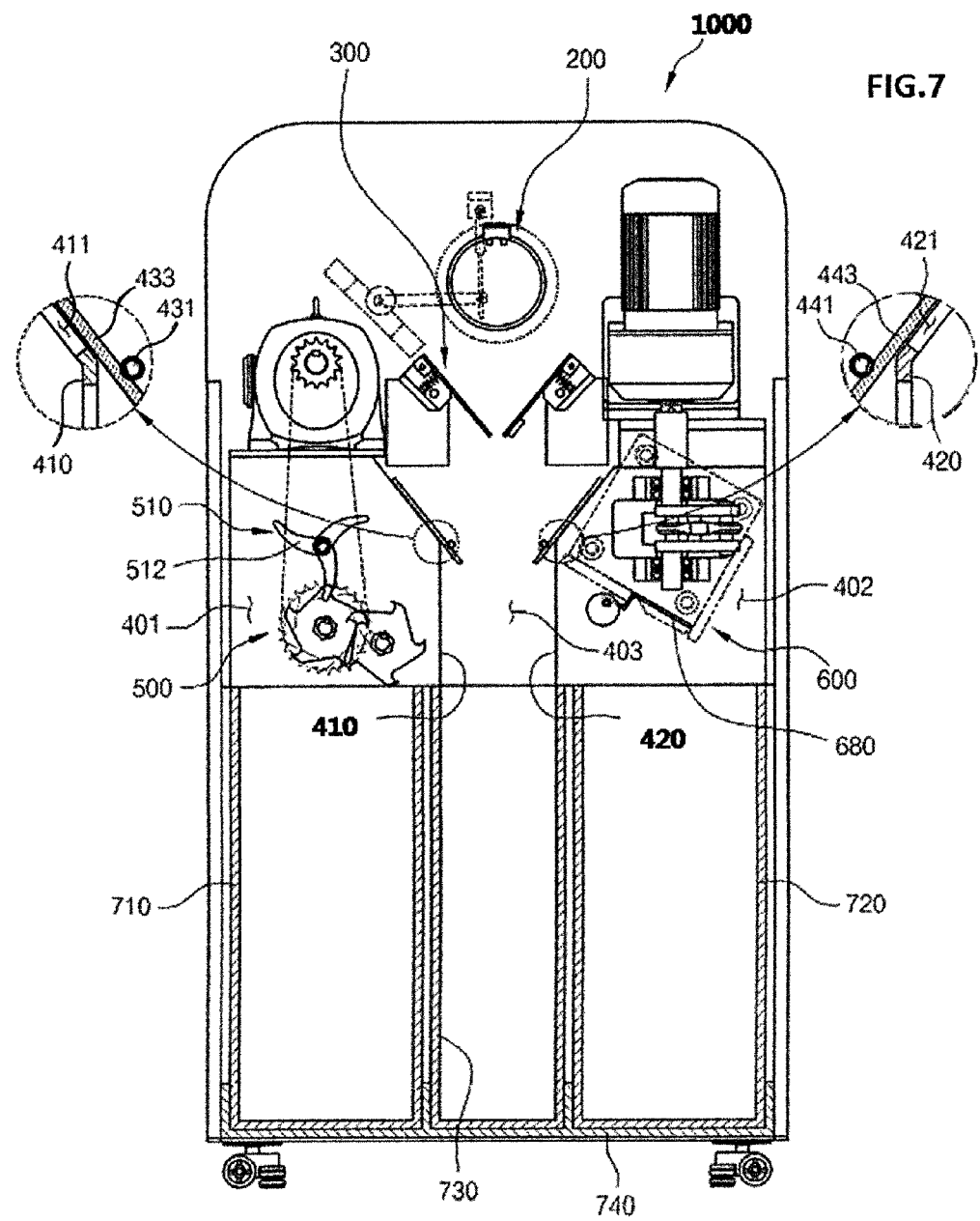
FIG. 7 shows a front perspective view of the selective collection system for recycling containers in accordance with an exemplary embodiment of the claimed invention.

The sorting guide device (400) guides the dropped material identified input materials from the material identification device (300) into a shredding side channel (401), a compressing side channel (402), or a dropping side channel (403). In accordance with an exemplary embodiment of the claimed invention, as shown in FIGS. 7, 9, 11, and 14-16, the sorting guide device (400) is installed below the material identification device (300) to form the shredding side channel (401), the compressing side channel (402) and the dropped side channel (403). Specifically, the shredding side channel (401) comprises a shredding side diaphragm (410) and a shredding side entrance (411). Likewise, the compressing side channel (402) comprises a compressing side diaphragm (420) and a compressing side entrance (421). The highlighted portions of the shredding side diaphragm (410) and the compressing side diaphragm (420) in FIG. 7 are attached to the front side panel (101) and the back side panel (102).

Figure 9:
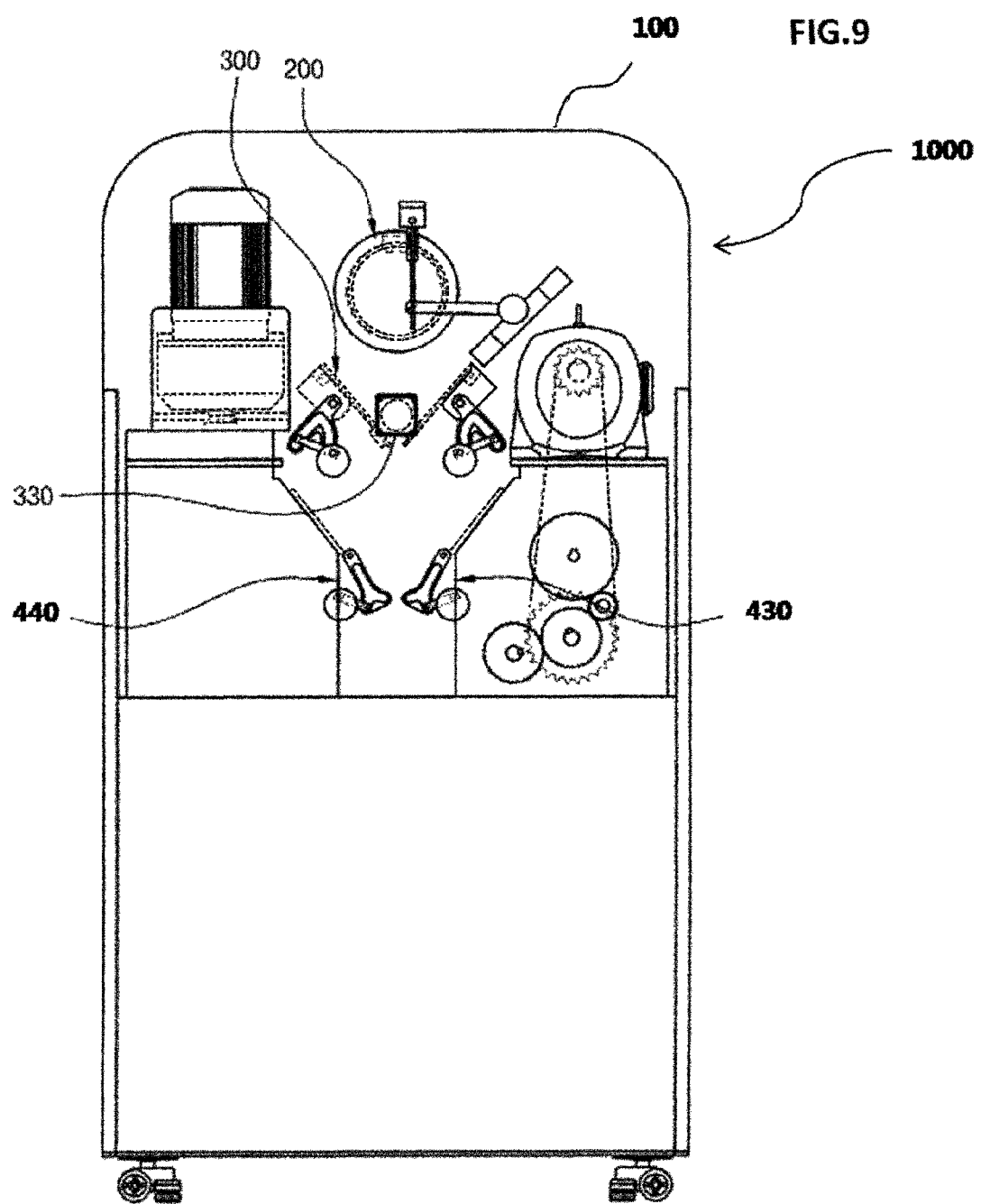
FIG. 9 shows a rear perspective view of the selective collection system for recycling containers in accordance with an exemplary embodiment of the claimed invention.

In accordance with an exemplary embodiment of the claimed invention, as exemplary shown in FIGS. 7, 9, and 11, the sorting guide device (400) further comprises a shredding side sorting space (430), which is installed next to the shredding side diaphragm (410), and a compressing side sorting space (440), which is installed next to the compressing side diaphragm (420). The shredding side sorting space (430) has a shredding side sorting shaft (431) running through the front and back side panels (101, 102). A shredding side servomotor (432) provides power to the shredding side sorting shaft (431) and is installed on the front side panel (101).

In accordance with an exemplary embodiment of the claimed invention, as shown in FIG. 11, the shredding side servomotor (432) powers the rotation of the shredding side sorting shaft (431), which in turn opens or closes a shredding side shutter (433) that is inserted into the shredding side sorting shaft (431). To prevent the shredding side shutter (433) from rotating excessively and possibly damaging other parts and devices of the selective collecting system (1000), the shredding side CAM slot (434) restricts excessive rotation of the shredding side shutter (433) by limiting the movement of a shredding side power transfer link (436).

In accordance with an exemplary embodiment of the claimed invention, one end of the shredding side power transfer link (436) moves up along the straight, upper portion of the shredding side CAM slot (434) to open the shredding side shutter (433). To prevent excessive rotation when closing the shredding side shutter (433), the end of the shredding side power transfer link (436) moves down along the straight, upper portion of the shredding side CAM slot (434) into one of two lower branches of the shredding side CAM slot (434).

Figure 15:
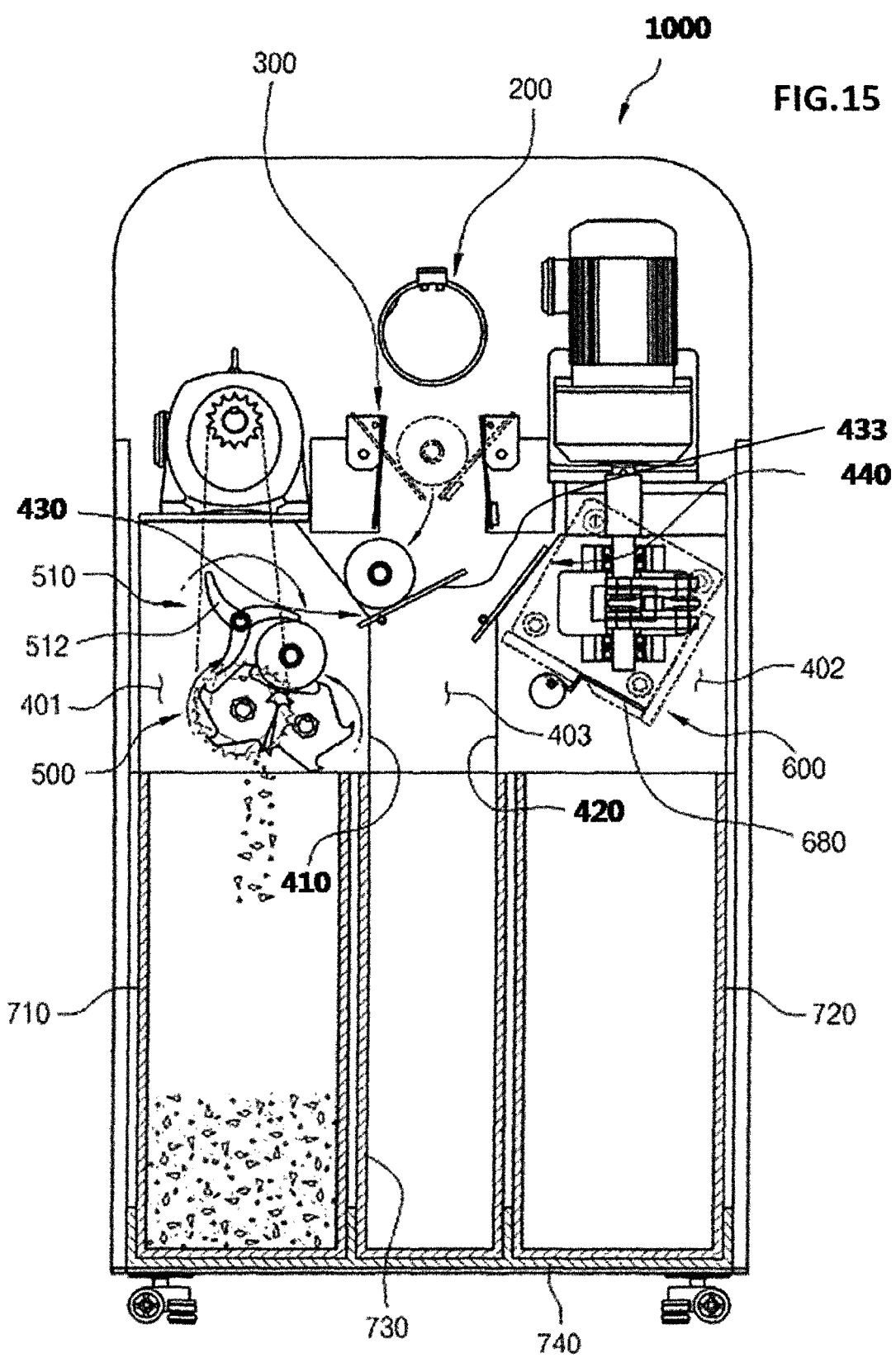
FIG. 15 shows an exemplary operational phase diagram of the sorting guide device routing the recyclable containers to be shredded to the shredding device of the selective collection system.

As exemplary shown in FIG. 15, when the material identification device (300) sends a signal to the control device (800) that the input material is to be shredded, the control device (800) commands the shredding side servomotor (432) to rotate counterclockwise (from the front) to open the shredding side shutter (433). If the compressing side shutter (443) is open, the control device (800) instructs a compressing side servomotor (442) to rotate counterclockwise to close the compressing side shutter (443) to ensure that the input material does not go into the compressing side channel (402). Once open, the shredding side shutter (433) receives the input material dropped from the material identification device (300), and routes it to the shredding device (500) located in the shredding side channel (401). After the input material is transported to the shredding device (500), the shredding side servomotor (432) rotates clockwise and closes the shredding side shutter (433).

In accordance with an exemplary embodiment of the claimed invention, the compressing side sorting space (440) has a compressing side sorting shaft (441) running through the front and back side panels (101, 102). The compressing side servomotor (442) provides power to the compressing side sorting shaft (441) and is installed on the front side panel (101). As with the shredding side sorting space (430), the compressing side shutter (443) is inserted into the compressing side sorting shaft (441). It is appreciated that the entire mechanism of the compressing side is same as that of the shredding side except that it works in the reverse direction.

In accordance with an exemplary embodiment of the claimed invention, as shown in FIG. 11, the compressing side servomotor (442) powers the operation of closing or opening the compressing side sorting space (440). To prevent the compressing side shutter (443) from rotating excessively and possibly damaging other parts and devices of the selective collection system (1000), the compressing side CAM slot (444) restricts the movement of the compressing side shutter (443) by limiting the movement of a compressing side power transfer link (446)

In accordance with an exemplary embodiment of the claimed invention, one end of the compressing side power transfer link (446) moves up along the straight, upper portion of the compressing side CAM slot (444) to open the compressing side shutter (443). To prevent excessive rotation when closing the compressing side shutter (443), the end of the compressing side power transfer link (446) moves down along the straight, upper portion of the compressing side CAM slot (444) into one of two lower branches of the compressing side CAM slot (444).

Figure 16:
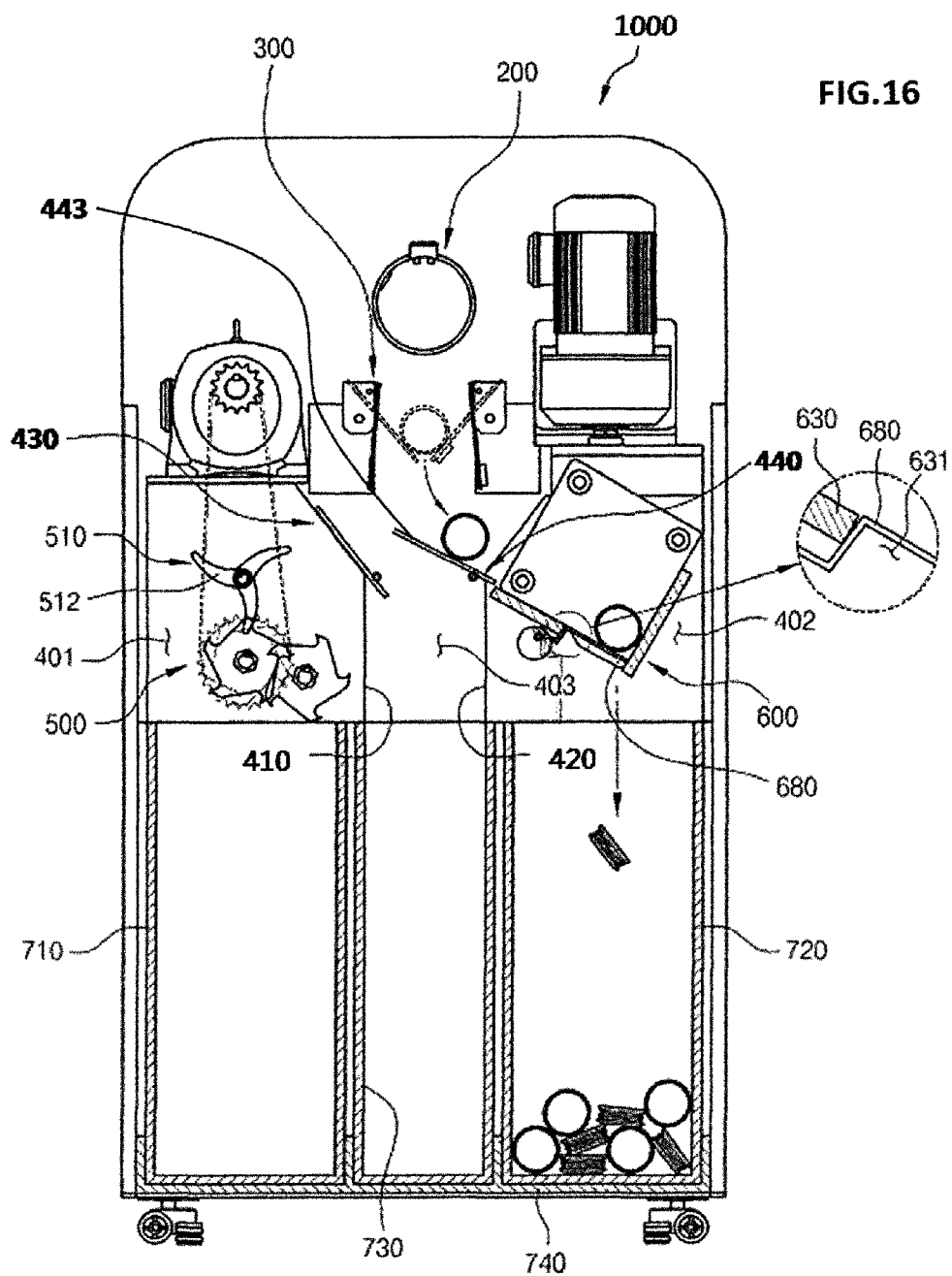
FIG. 16 shows an exemplary operational phase diagram of the sorting guide device routing the recyclable containers to be compressed to the compressing device of the selective collection system.

As exemplary shown in FIG. 16, when the material identification device (300) sends a signal to the control device (800) that the input material is to be compressed, the control device (800) instructs the compressing side servomotor (442) rotates clockwise (from the front) to open the compressing side shutter (443). If the compressing side shutter (444) is open, the compressing side servomotor (442) rotates clockwise to close the compressing side shutter (444) to ensure that the input material does not go into the shredding side channel (401). Once open, the compressing side shutter (443) receives the input material dropped from the material identification device (300), and routes it to the compressing device (600) located in the compressing side channel (402). After the input material is transported to the compressing device (600), the compressing side servomotor (442) rotates counterclockwise and closes the compressing side shutter (443).

Figure 14:
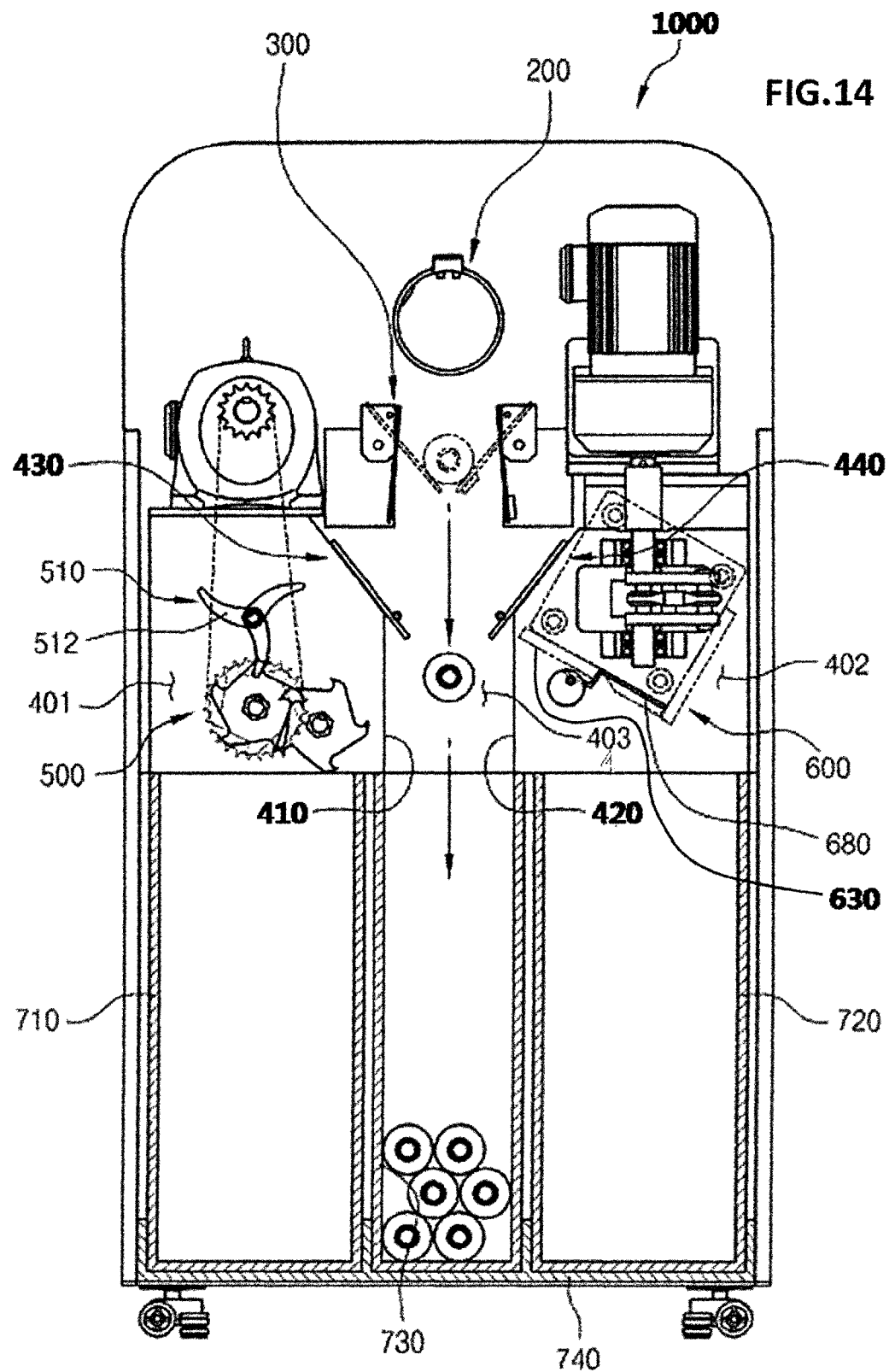
FIG. 14 shows an exemplary operational phase diagram of the sorting guide device of the selective collection system routing the recyclable containers identified for collection without performing any shredding or compressing operation to a collection bin.

As exemplary shown in FIG. 14, when the material identification device (300) signals to the control device (800) that the input material is neither to be shredded nor compressed, the drop shutters (433, 443) remain closed or close if the drop shutters (433, 443) were open. The sorting guide device (400) routes the input material directly to the other materials collection bin (730).

In accordance with an exemplary embodiment of the claimed invention, the control device (800) can comprise a process or, a processor based computer, a computer system and the like, and will not be discussed herein because such device and system is well known to one of ordinary skill in the art. The control device (800) has a data storage unit (810) such as memory, hard disk, database, and the like, which will not be discussed for the same reason. The control device (800) can communicate with a network server or central computer through a communications network. The control device (800) categorizes the input materials into plastics (e.g., PET bottles), metal cans (e.g., aluminum cans and steel cans), glass bottles and debris based on the signals received from the material identification device (300). The control device (800) controls the sorting guide device (400) to transport the categorized input material to the shredding device (500), the compressing device (600), or the other materials collection bin (730). Shredded materials from the shredding device (500) are ultimately routed to a PET collection bin (710), and compressed materials from the compressing device (600) and routed to an aluminum can collection bin (720).

In accordance with an exemplary embodiment of the claimed invention, the data storage unit (810) holds the necessary data for identifying input materials. For example, the standard weight ranges of general input materials are: 18 to 45 g for PET bottles, 10 to 20 g for aluminum cans, 20 g or greater for steel cans and 45 g or greater for glass bottles. The stored data can be reset or adjusted to accommodate for any disparities in size and weight. Once an input material is transported into the material identification device (300), the input material makes contact with the metal detect sensor (330) as exemplary shown in FIG. 6, which is part of the material identification device (300). The metal detect sensor (330) determines whether the input material is a metal and transmits the appropriate signal to the control device (800), which recognizes the signal and stores the received in the data storage unit (810). If the input material is recognized to be a metal, the control device (800) determines whether the metal is aluminum or steel by comparing the weight datum transmitted directly from two load cells (340), which are installed at the bottom of the material identification device (300), with the data stored in the data storage unit (810). If the input material is determined to be an aluminum can, then the control device (800) commands the sorting guide device (400) to send the input material to the compressing device (600). In accordance with an embodiment of the claimed exemplary invention, as exemplary shown in FIG. 16, the control device (800) opens the downward sloping stands (320) of the material identification device (300), thereby dropping the aluminum can into the compressing side sorting space (440) through the compressing side entrance (421). Then the aluminum can is compressed by the compressing device (600) and deposited to the aluminum can collection bin (720). Of course, the control device (800) closes the shredding side shutter (433), if open, prior to dropping the input material from the material identification device (300).

Conversely, if the metal input material is determined to be a steel can, then the control device (800) closes or keeps closed both the shredding side shutter (433) and the compressing side shutter (443). As exemplary shown in FIG. 14, the control device (800) commands the downward sloping stands (320) of the material identification device (300) to open, thereby dropping the steel can into the other materials collection bin (730). To properly separate the processed input materials, three bins are placed within the interior of the claimed selective collection system (1000): the PET bottle collection bin (710), aluminum can collection bin (720) and the other materials collection bin (730), which is used to collect less popular input materials, such as glass bottles and steel cans, as well as foreign objects, such as rocks, papers and the like.

If the metal detect sensor (330) recognizes an input material as a nonmetal, it sends a signal to the control device (800) so that the input material is categorized as a non-metal. Then, two load cells (340) and the control panel (800) interact in a manner analogous to the process aforementioned, that is, the control device (800) determines whether the nonmetal input material is a PET bottle or another material from the weight datum received from two load cells (340). If the nonmetal input material is determined to be a PET, the control device (800) opens the shredding side shutter (433) and closes or keeps closed the compressing side shutter. As exemplary shown in FIG. 15, the control device (800) controls the downward sloping stands (320) of the material identification device (300) to open, thereby dropping a PET bottle into the shredding side sorting space (430) through the shredding side entrance (411). Then the PET bottle is shredded by the shredding device (500) and deposited into the PET bottle collection bin (710).

If the non-metal input material is determined to be a glass bottle, the control device (800) sends an appropriate signal so that the downward sloping stands (320) open and the glass bottle is deposited into the other materials collection bin (730).

In accordance with an exemplary embodiment of the claimed invention, as exemplary shown in FIGS. 7, and 14-16, the collection part (700) comprises of three collection bins (710, 720, 730) and the collection bin drawer (740), which holds each bin. The bins are categorized, as aforementioned, into the PET bottle collection bin (710), aluminum can collection bin (720) and the other materials collection bin (730). The PET bottle collection bin (710) is positioned below the shredding device (500), the aluminum can collection bin (720) below the compressing device (600) and the other materials collection bin (730) below the sorting guide device (400) and between shredding side and compressing side diaphragms (410, 420). In accordance with an aspect of the claimed invention, as exemplary shown in FIG. 8, the bin collection drawer (740) can be slid in and out of the housing part (100) to allow the containment or the removal of the three collection bins (710, 720, 730).

As exemplary shown in FIG. 15, the shredding device (500) is located in the shredding side channel (401) to shred PET bottle materials dropped from the sorting guide device (400) through the shredding side entrance (411). As noted herein, the conventional press separate storage system lacks a mechanism that would force a PET bottle to be forced into its shredding device; thus, it was not rare for shredding to take an inordinate amount of time or even fail. In accordance with an exemplary embodiment of the claimed invention, the shredding device (500) of the selective collection system (1000) comprises a shredding device forced entry part (510) to force a PET bottle into the shredding device (500) to reduce the shredding time of PET bottles and to ensure successful shredding. The shredding device forced entry part (510), which is located at the upper section of the shredding device (500), holds the PET bottle while the blades of the shredding device (500) shred the PET; this process is exemplary illustrated in FIG. 15. The shredded PET bottle is then deposited into the PET bottle collection bin (710).

In accordance with an embodiment of the claimed invention, as shown in FIGS. 7, 8, 14, 15, and 16, the shredding device forced entry part (510) comprises of a forced entry shaft (511) and forced entry wings (512) that are inserted into the forced entry shaft (511). The shredding device forced entry part (510) is powered by a shredding device power motor (520), which also powers the shredding device (500). The forced entry wings (512) forcibly push the input material into the shredding device (500).

In accordance with an exemplary embodiment of the claimed invention, as shown in FIGS. 12-14 and 16, the compressing device (600) comprises of a front press plate (610) with a guide hole (611), a back press plate (620) and a top down plate (630) with a compressed can output space (631) at its lower part. The back press plate (620) is attached to the back side panel (102). The lower part of the top down plate (630) is fixed between the front press plate (610) and the back press plate (620). A compressed can output shutter (680) opens to let out a compressed aluminum can through the compressed can output space (631) on the top down plate (630) and closes or stays closed before an aluminum can is compressed. The shutter (680) is inserted into a shaft, which is rotated by a servomotor attached to the top down plate (630). The shutter (680) opens or closes as the servomotor rotates the shaft. An aluminum can is compressed by the middle press plate (640), which is pushed or pulled by a press shaft (650) moving in and out of a guide hole (611). A compressing device power motor (660) powers the compressing device (600) through a press shaft (650) and a rotary device (670). One end of the press shaft (650) is linked with a hinge to the middle press plate (640). The other end of the press shaft (650) is linked with a hinge to one end of a rotary device (670). The other end of the rotary device (670) is connected to a gear coupling (661).

Although the explanation above on the appropriate use of this invention is detailed, the range of rights on the invention is not limited on this. The various modifications and improved form based on the basic concept of this invention is also included in the range of rights on the invention.

What is claimed is:

1. A selective collection system for recyclable containers, comprising:
    a housing part to house internal components of the selective collection system;
    a control device to control overall operation of the selective collection system;
    an input device installed on the front of the housing part to receive an input material;
    a material identification device to identify an input material and to transmit a corresponding material identification signal to the control device, which identifies the input material based on the material identification signal, wherein the material identification device comprises:
        a front side plate;
        a back side plate;
        a pair of downward sloping stands inserted into two shafts that rotate between the front side and back side plates to open the pair of downward sloping stands after the material identification device identifies the input material and transmits the corresponding material identification signal to the control device, and to close the pair of downward sloping stands when the material identification device is identifying the input material;
        a metal detect sensor to sense the input material on the pair of downward sloping stands and transmits a metal detect signal to the control device; and
        two load cells, installed below the pair of downward sloping stands, to weigh the input material on the pair of downward sloping stands and to transmit the weight datum to the control device;
    wherein the control device determines whether the input material on the pair of downward sloping stands is a metal based on the metal detect signal; and
    a sorting guide device to route the input material received from the material identification device based on identification of the input material by the control device to one of the following devices:
        a shredding device to shred the input material dropped from the sorting guide device and identified as a polyethylene terephthalate (PET) bottle by the control device;
        a compressing device to compress the input material dropped from the sorting guide device and identified as an aluminum can by the control device; and
        a collection part comprising three collection bins into which shredded, compressed, or unprocessed input materials are deposited, respectively, the input material identified as being neither a PET bottle nor an aluminum can by the control device is dropped from the sorting guide device without any processing into a collection bin storing the unprocessed input material.

2. The selective collection system of claim 1, wherein the input device comprises:
    an input slot, an opening on the upper portion of the housing part, into which the input material is inserted;
    a sliding door to open and close the input slot;
    an upper swivel;
    a supporting shaft attached to and rotating about the upper swivel;
    a secondary shaft with a first end fixed onto the supporting shaft and a second end attached to the sliding door;

a lower swivel;

a primary shaft with a first end linked to the second end of the secondary shaft attached to the sliding door and a second end attached to the lower swivel, the primary shaft rotating about the lower swivel;

an input servomotor to power rotation of the primary shaft; and an input detect sensor, installed inside the input slot and on the exterior of the housing part, to transmit a signal to the control device upon detection of an input material, thereby prompting the control device to open the sliding door.

3. The selective collection system of claim 1, wherein the material identification device identifies the input material as one of the following: PET, aluminum can, and other.

4. The selective collection system of claim 1, wherein the material identification device further comprises a forced transport part to forcibly position horizontally the input material received from the input device and to transport the forcibly horizontally positioned input material to the metal detect sensor.

5. The selective collection system of claim 4, wherein the forced transport part comprises:
   a driving pulley;
   a driven pulley;
   a conveyor belt that connects the driving pulley to the driven pulley; and
   a forced transport servomotor to provide power to the driving pulley.

6. The selective collection system of claim 1, wherein the sorting guide device is installed below the material identification device to sort the input material and comprises:
   a shredding side diaphragm to enclose the shredding device;
   a shredding side entrance to provide the input material identified as the PET bottle a passage to the shredding device;
   a shredding side shutter to open and close the shredding side entrance;
   a shredding side sorting shaft into which the shredding side shutter is inserted;
   a shredding side servomotor to power opening and closing of the shredding side shutter;
   a shredding side power transfer link connected to the shredding side servomotor and the shredding side sorting shaft, the shredding side servomotor is operable to rotate the shredding side sorting shaft via the shredding side power transfer link; and
   a shredding side CAM to limit movement of the shredding side shutter.

7. The selective collection system of claim 6, wherein the sorting guide device further comprises:
   a compressing side diaphragm to enclose the compressing device;
   a compressing side entrance to provide the input material identified as the aluminum can a passage to the compressing device;
   a compressing side shutter to open and close the compressing side entrance;
   a compressing side sorting shaft into which the compressing side shutter is inserted;
   a compressing side servomotor to power opening and closing of the compressing side shutter;
   a compressing side power transfer link connected to the compressing side servomotor and the compressing side sorting shaft, the compressing side servomotor is operable to rotate the compressing side sorting shaft via the compressing side power transfer link; and
   a compressing side CAM to limit movement of the compressing side shutter.

8. The selective collection system of claim 1, wherein the collection part comprises:
   a PET bottle collection bin to collect shredded PET bottles from the shredding device;
   an aluminum can collection bin to collect compressed aluminum cans from the compressing device;
   an other materials collection bin to collect other materials dropped through a dropping side channel of the sorting guide device; and
   a collection bin drawer to place the three collection bins.

9. The selective collection system of claim 1, wherein the shredding device comprises:
   a shredding device forced entry part to forcefully inserts the PET bottle into the shredding device; and
   a shredding device power motor to provide power to the shredding device to perform a shredding process.

10. The selective collection system of claim 9, wherein the shredding device forced entry comprises:
    forced entry wings to insert the PET bottle into rotating blades of the shredding device; and
    a forced entry shaft into which the forced entry wings are inserted.

11. The selective collection system of claim 1, wherein the compressing device comprises:
    a front press plate with a guide hole;
    a back press plate;
    a top down plate with a lower portion fixed into the front and back press plates;
    a middle press plate, installed between the front and back press plates, to compress the aluminum can;
    a press shaft moving in and out of the guide hole of the front press plate, and having one of its ends linked with a hinge to the middle press plate to push the middle press plate;
    a compressing device power motor to provide power to the compressing device to perform a compressing process;
    a rotary device with one end linked with a hinge to the press shaft and another end linked to the compressing device power motor through a gear coupling;
    a compressed can output space at the lower portion of the top down plate through which a compressed aluminum can is released; and
    a compressed can output shutter to open and close the compressed can output space.

12. A selective collection system for recycling containers, comprising:
    a selective collection housing;
    an input device installed at a side part of the selective collection housing to input the containers with sides of the containers touching bottom of the input device;
    a material identification device with a bottom part that opens and closes to identify a material of the containers, the sides of the containers touching bottom of the material identification device when received from the input device, to generate a material identification signal for each container, wherein the material identification device comprises:
    a front side plate;
    a back side plate;
    a pair of downward sloping stands inserted into two shafts that rotate between the front side and back side plates to open the pair of downward sloping stands after the material identification device identifies the input material and transmits the corresponding material identification signal to a control device, and to close the pair of downward sloping stands when the material identification device is identifying the input material;

a metal detect sensor to sense the input material on the pair of downward sloping stands and transmits a metal detect signal to the control device; and two load cells, installed below the pair of downward sloping stands, to weigh the input material on the pair of downward sloping stands and to transmit the weight datum to the control device;

wherein the control device determines whether the input material on the pair of downward sloping stands is a metal based on the metal detect signal;

a sorting guide device to guide material identified containers dropped on their sides from the material identification device into a corresponding load space;

a shredding device to shred the containers that are dropped on their sides from the sorting-guide device;

a compressing device to compress upper and lower sides of the containers that are dropped on their sides from the sorting-guide device;

a material collection part comprising collection bins categorized by material to collect and sort containers by material that are dropped from the sorting-guide device, the shredding device and the compressing device; and wherein the control device controls a material identification operation, a compression operation, a shredding operation, and the sorting-guide device to guide the containers on their sides into the corresponding load space based on the material identification signal received from the material identification device.

13. The selective collection system of claim 12, wherein the input device comprises:
an input slot, an opening on the upper portion of the housing part, into which the input material is inserted;
a sliding door to open and close the input slot;
an upper swivel;
a supporting shaft attached to and rotating about the upper swivel;
a secondary shaft with a first end fixed onto the supporting shaft and a second end attached to the sliding door;
a lower swivel;
a primary shaft with a first end linked to the second end of the secondary shaft attached to the sliding door and a second end attached to the lower swivel, the primary shaft rotating about the lower swivel;
an input servomotor to power rotation of the primary shaft; and
an input detect sensor, installed inside the input slot and on the exterior of the housing part, to transmit a signal to the control device upon detection of an input material, thereby prompting the control device to open the sliding door.

14. The selective collection system of claim 12, wherein the material identification device identifies the input material as one of the following: PET, aluminum can, and other.

15. A selective collection system for recyclable containers, comprising:
a housing part to house internal components of the selective collection system;
a control device to control overall operation of the selective collection system;
an input device installed on the front of the housing part to receive an input material;

a material identification device to identify an input material and to transmit a corresponding material identification signal to the control device, which identifies the input material based on the material identification signal; and a sorting guide device to route the input material received from the material identification device based on identification of the input material by the control device to one of the following devices:

a shredding device to shred the input material dropped from the sorting guide device and identified as a polyethylene terephthalate (PET) bottle by the control device;

a compressing device to compress the input material dropped from the sorting guide device and identified as an aluminum can by the control device;

a collection part comprising three collection bins into which shredded, compressed, or unprocessed input materials are deposited, respectively, the input material identified as being neither a PET bottle nor an aluminum can by the control device is dropped from the sorting guide device without any processing into a collection bin storing the unprocessed input material;

wherein the sorting guide device is installed below the material identification device to sort the input material and comprises:

a shredding side diaphragm to enclose the shredding device;

a shredding side entrance to provide the input material identified as the PET bottle a passage to the shredding device;

a shredding side shutter to open and close the shredding side entrance;

a shredding side sorting shaft into which the shredding side shutter is inserted;

a shredding side servomotor to power opening and closing of the shredding side shutter;

a shredding side power transfer link connected to the shredding side servomotor and the shredding side sorting shaft, the shredding side servomotor is operable to rotate the shredding side sorting shaft via the shredding side power transfer link; and a shredding side CAM to limit movement of the shredding side shutter.

16. The selective collection system of claim 15, wherein the material identification device comprises:
a front side plate;
a back side plate;
a pair of downward sloping stands inserted into two shafts that rotate between the front side and back side plates to open the pair of downward sloping stands after the material identification device identifies the input material and transmits the corresponding material identification signal to the control device, and to close the pair of downward sloping stands when the material identification device is identifying the input material;
a metal detect sensor to sense the input material on the pair of downward sloping stands and transmits a metal detect signal to the control device; and
two load cells, installed below the pair of downward sloping stands, to weigh the input material on the pair of downward sloping stands and to transmit the weight datum to the control device; and
wherein the control device determines whether the input material on the pair of downward sloping stands is a metal based on the metal detect signal.

17. The selective collection system of claim 15, wherein the material identification device identifies the input material as one of the following: PET, aluminum can, and other.

18. The selective collection system of claim 15, wherein the input device comprises:
- an input slot, an opening on the upper portion of the housing part, into which the input material is inserted;
- a sliding door to open and close the input slot;
- an upper swivel;
- a supporting shaft attached to and rotating about the upper swivel;
- a secondary shaft with a first end fixed onto the supporting shaft and a second end attached to the sliding door;
- a lower swivel;
- a primary shaft with a first end linked to the second end of the secondary shaft attached to the sliding door and a second end attached to the lower swivel, the primary shaft rotating about the lower swivel;
- an input servomotor to power rotation of the primary shaft; and
- an input detect sensor, installed inside the input slot and on the exterior of the housing part, to transmit a signal to the control device upon detection of an input material, thereby prompting the control device to open the sliding door.

* * * * *